United States Patent
Ochiai

(10) Patent No.: US 11,733,976 B2
(45) Date of Patent: Aug. 22, 2023

(54) SOFTWARE CREATION BASED ON SETTABLE PROGRAMMING LANGUAGE

(71) Applicant: DAI NIPPON PRINTING CO., LTD., Tokyo (JP)

(72) Inventor: Toshihiko Ochiai, Koganei (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/608,694

(22) PCT Filed: Nov. 5, 2020

(86) PCT No.: PCT/JP2020/041384
§ 371 (c)(1),
(2) Date: Nov. 3, 2021

(87) PCT Pub. No.: WO2021/090890
PCT Pub. Date: May 14, 2021

(65) Prior Publication Data
US 2022/0236956 A1 Jul. 28, 2022

(30) Foreign Application Priority Data
Nov. 8, 2019 (JP) .................... 2019-203353

(51) Int. Cl.
*G06F 8/30* (2018.01)
*G06F 8/10* (2018.01)

(52) U.S. Cl.
CPC . *G06F 8/30* (2013.01); *G06F 8/10* (2013.01)

(58) Field of Classification Search
CPC ..................... G06F 8/30; G06F 8/10
(Continued)

(56) References Cited

U.S. PATENT DOCUMENTS 5,269,014 A 12/1993 Ogino
9,141,916 B1 * 9/2015 Corrado ................ G06N 3/084
(Continued)

FOREIGN PATENT DOCUMENTS

JP H01-298435 A 12/1989
JP 2019-008169 A 1/2019
JP 2019-032659 A 2/2019

OTHER PUBLICATIONS

Wasserman, "Software Engineering Issues for Mobile Application Development", ACM, pp. 397-400 (Year: 2010).*
(Continued)

*Primary Examiner* — Anil Khatri
(74) *Attorney, Agent, or Firm* — Oliff PLC

(57) ABSTRACT

The objective of the present invention is to provide a software creating device and the like with which labor savings can be made when creating software. A software creating device according to the present invention creates software for controlling equipment such as a certification photograph machine. The software creating device 1 includes, for example: a storage part for storing a plurality of basic modules for executing each of a plurality of processes; and a software creating part for employing the basic modules to perform deep reinforcement learning to create, by part of a combination of the basic modules, software for consecutively performing the plurality of processes in equipment such as a certification photograph machine.

18 Claims, 11 Drawing Sheets

(58) Field of Classification Search
USPC .............................. 717/105–122; 706/12–45
See application file for complete search history.

(56) References Cited

U.S. PATENT DOCUMENTS

| | | | | |
|---|---|---|---|---|
| 9,235,978 | B1* | 1/2016 | Charlton | G06F 9/542 |
| 10,013,639 | B1* | 7/2018 | Schurman | G06F 16/583 |
| 10,621,602 | B2* | 4/2020 | Bates | G06Q 10/067 |
| 10,717,004 | B2* | 7/2020 | Buttner | A63F 13/65 |
| 10,810,492 | B2* | 10/2020 | Xu | G06N 3/063 |
| 10,992,604 | B1* | 4/2021 | Knas | H04L 51/04 |
| 11,481,553 | B1* | 10/2022 | Durvasula | G06F 40/279 |
| 11,579,868 | B1* | 2/2023 | Zhang | G06N 20/00 |
| 11,610,110 | B2* | 3/2023 | Kursun | G06N 3/042 |
| 11,625,604 | B2* | 4/2023 | Budden | G06N 3/088 706/25 |
| 2017/0212829 | A1* | 7/2017 | Bales | G06F 11/3612 |
| 2018/0357552 | A1* | 12/2018 | Campos | G06F 16/901 |
| 2019/0042990 | A1 | 2/2019 | Paul et al. | |
| 2019/0220253 | A1* | 7/2019 | Pradhan | G06N 3/08 |
| 2022/0266145 | A1* | 8/2022 | Gisslén | G06N 3/08 |

OTHER PUBLICATIONS

Chen et al, "A Comprehensive Study on Challenges in Deploying Deep Learning Based Software", AVM, pp. 750-762 (Year: 2020).*
Akanksha et al, "Review on Reinforcement Learning, Research Evolution and Scope of Application", IEEE, pp. 1416-1423 (Year: 2021).*
Greasley et al, "Implementing Reinforcement Learning in Simio Discrete-Event Simulation Software", ACM, pp. 1-11 (Year: 2020).*
Tesauro et al, "A Hybrid Reinforcement Learning Approach to Autonomic Resource Allocation", IEEE, pp. 65-73 (Year: 2006).*
Wong et al, "Reinforcement-Learning-Guided Source Code Summarization Using Hierarchical Attention", IEEE, pp. 102-119 (Year: 2022).*
Jan. 26, 2021 International Search Report issued in International Patent Application No. PCT/JP2020/041384.
Aug. 2, 2022 Translation of Office Action issued in Japanese Patent Application No. 2021-555108.
May 10, 2022 International Preliminary Report on Patentability issued in International Patent Application No. PCT/JP2020/041384.

* cited by examiner

[Fig. 1]
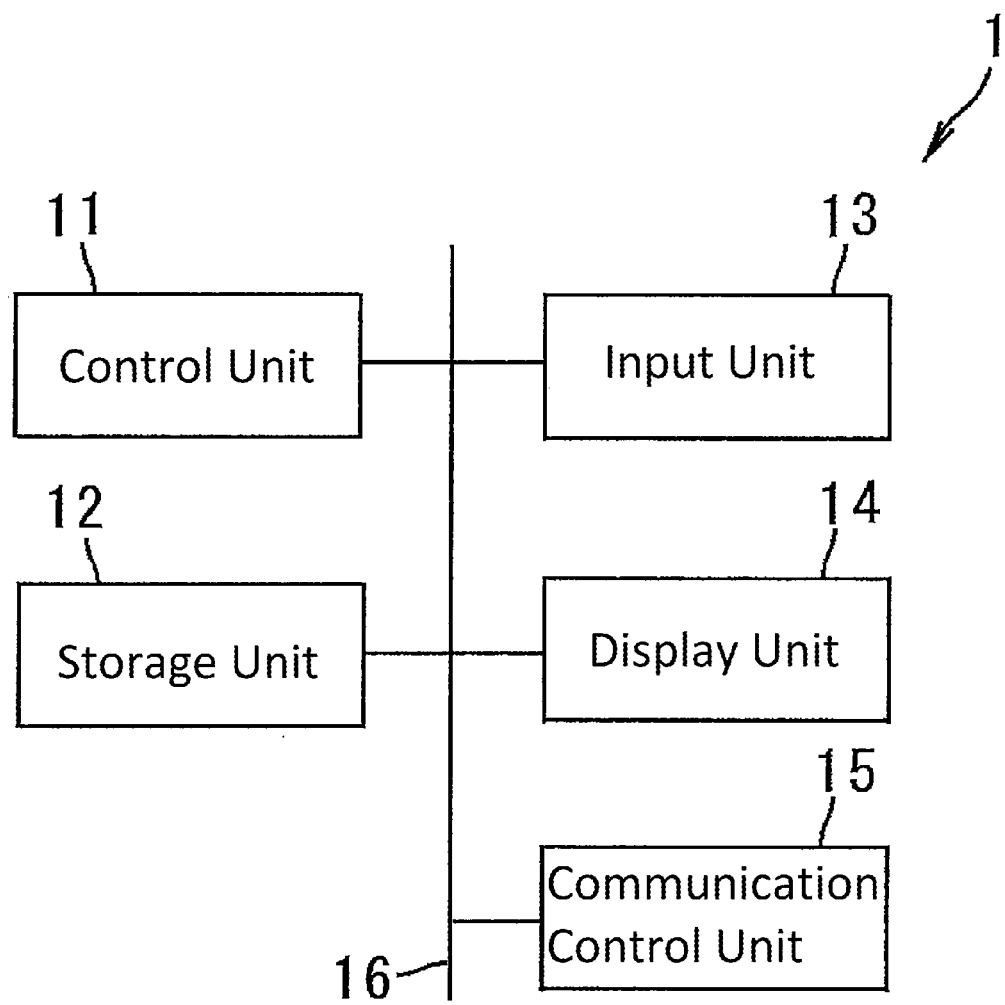

[Fig. 2]
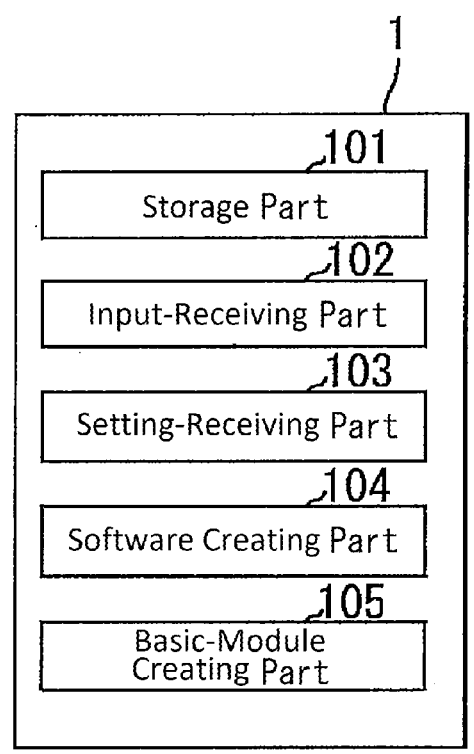

[Fig. 3]
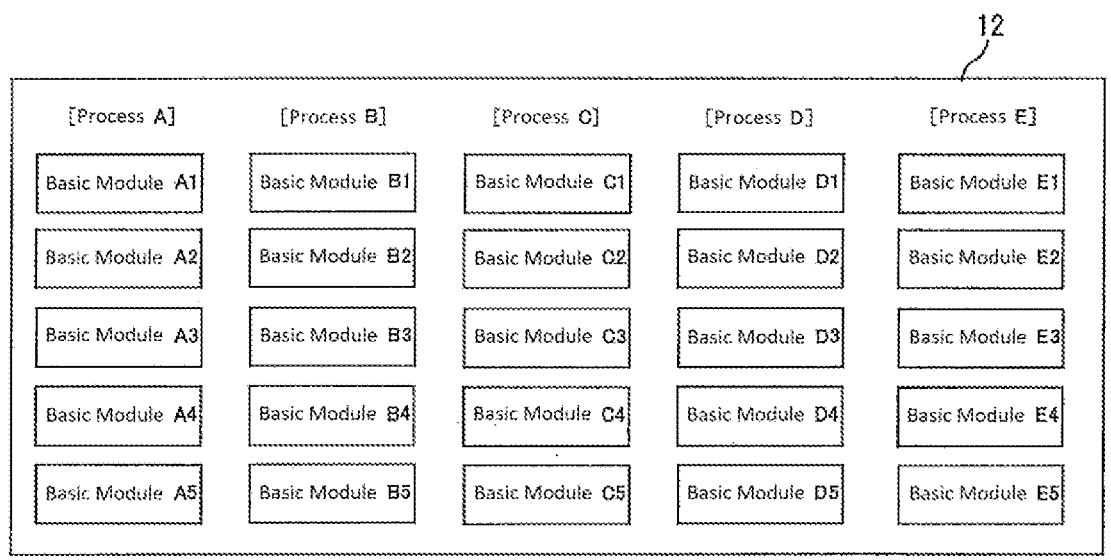

[Fig. 4]
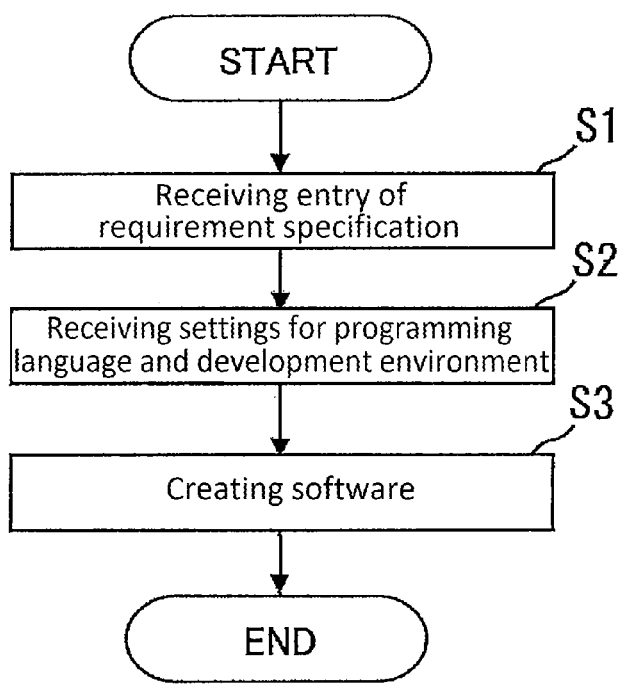

[Fig. 5]
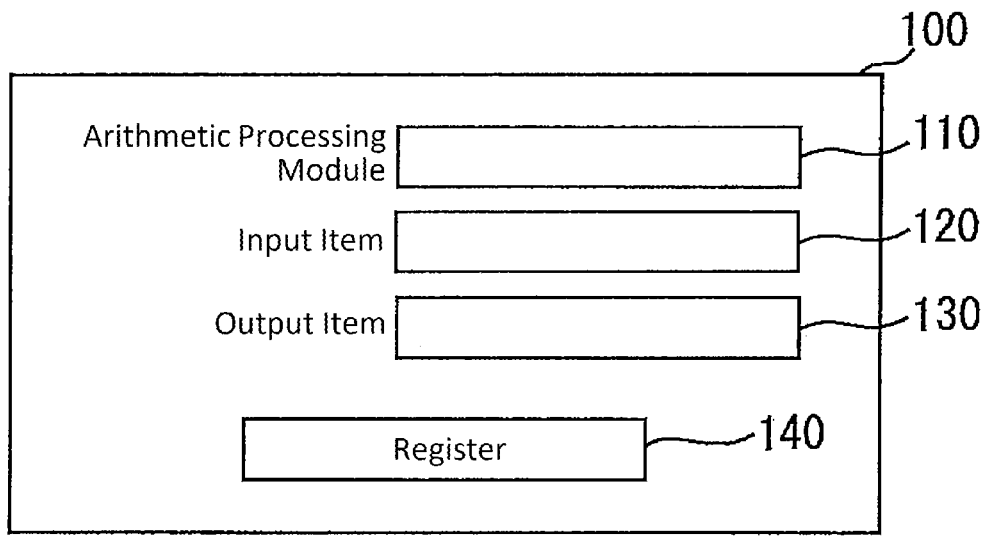

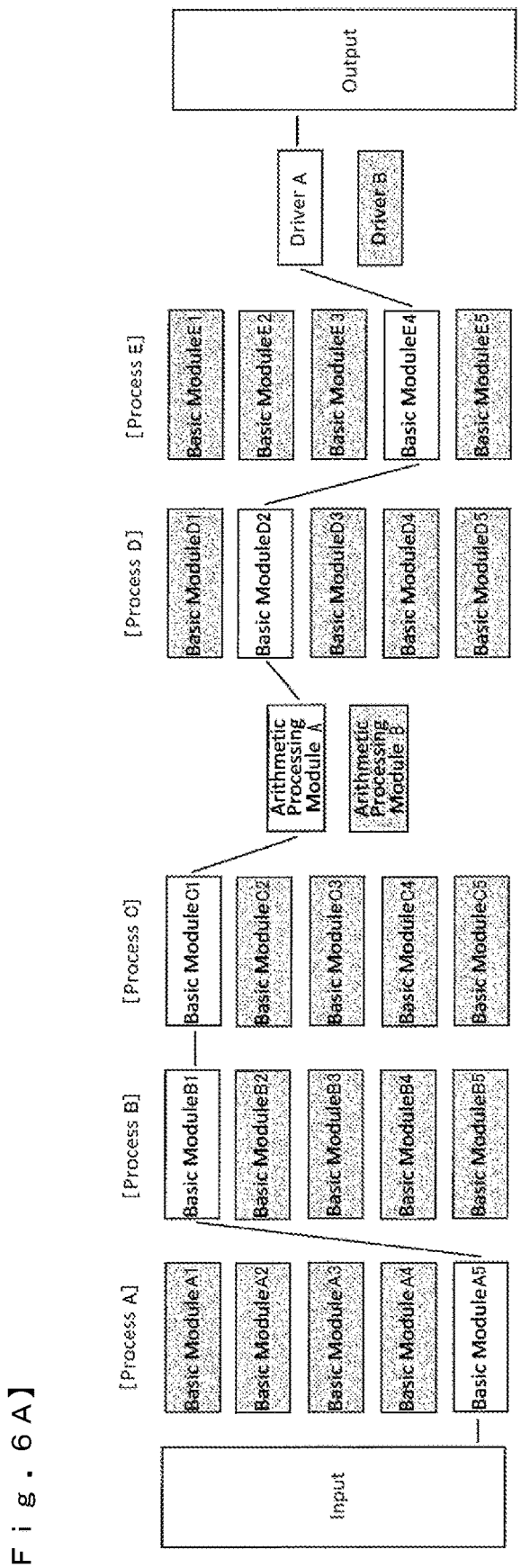

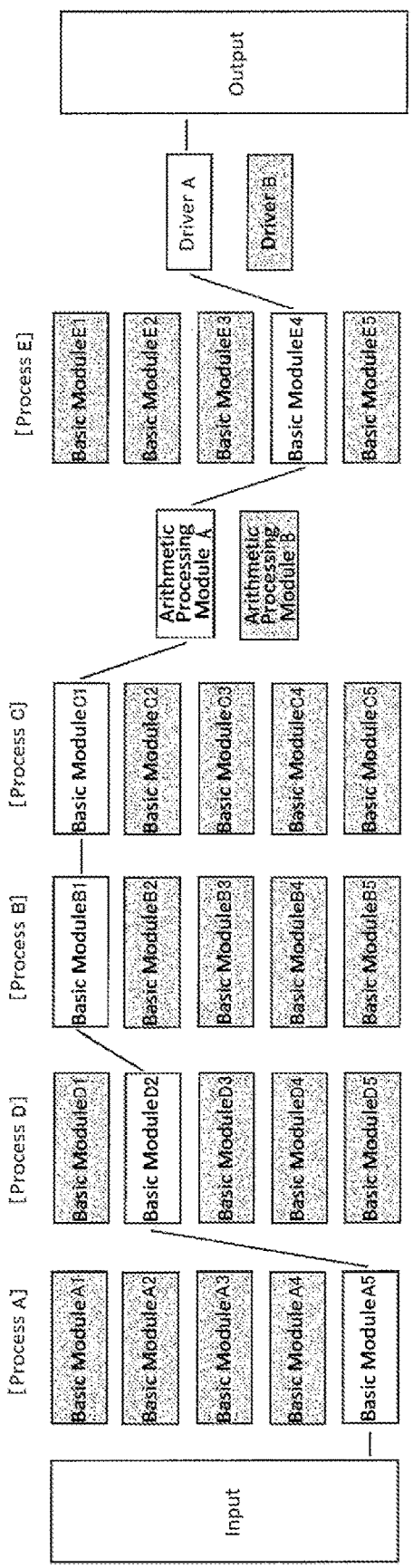
[Fig. 6B]

[Fig. 7]
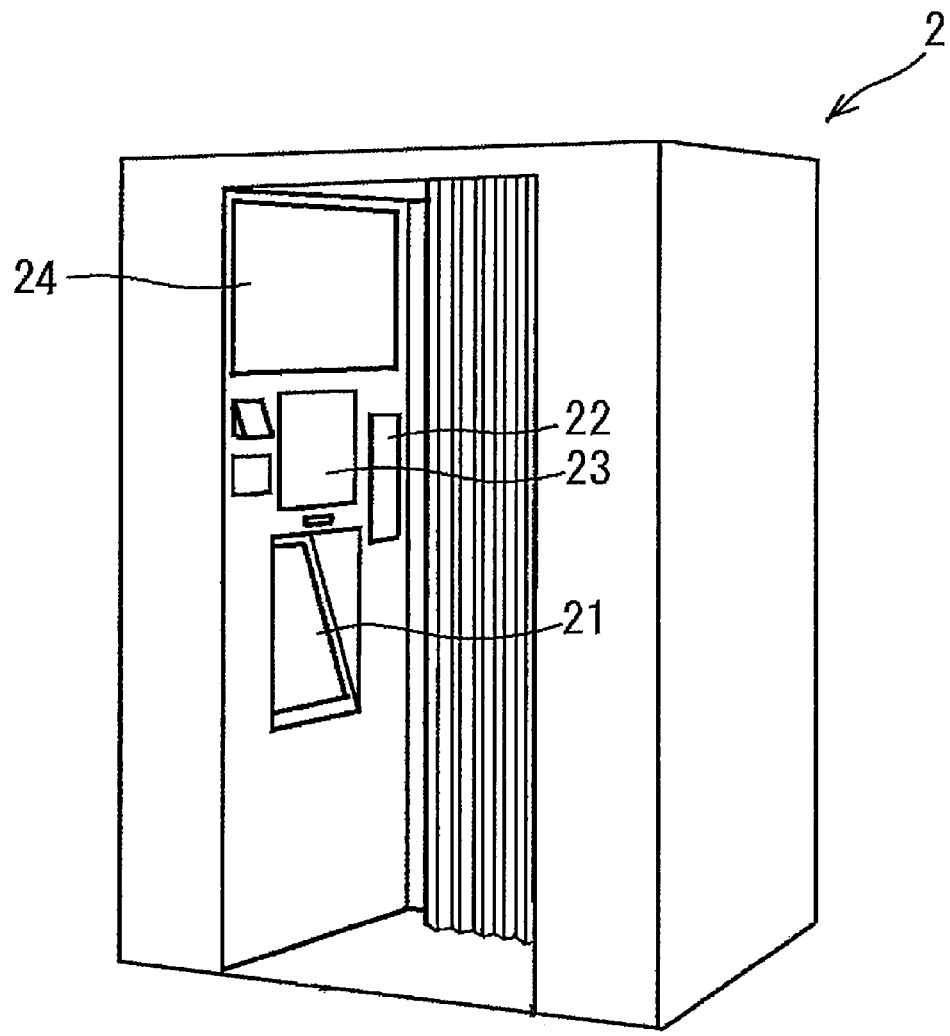

[Fig. 8]
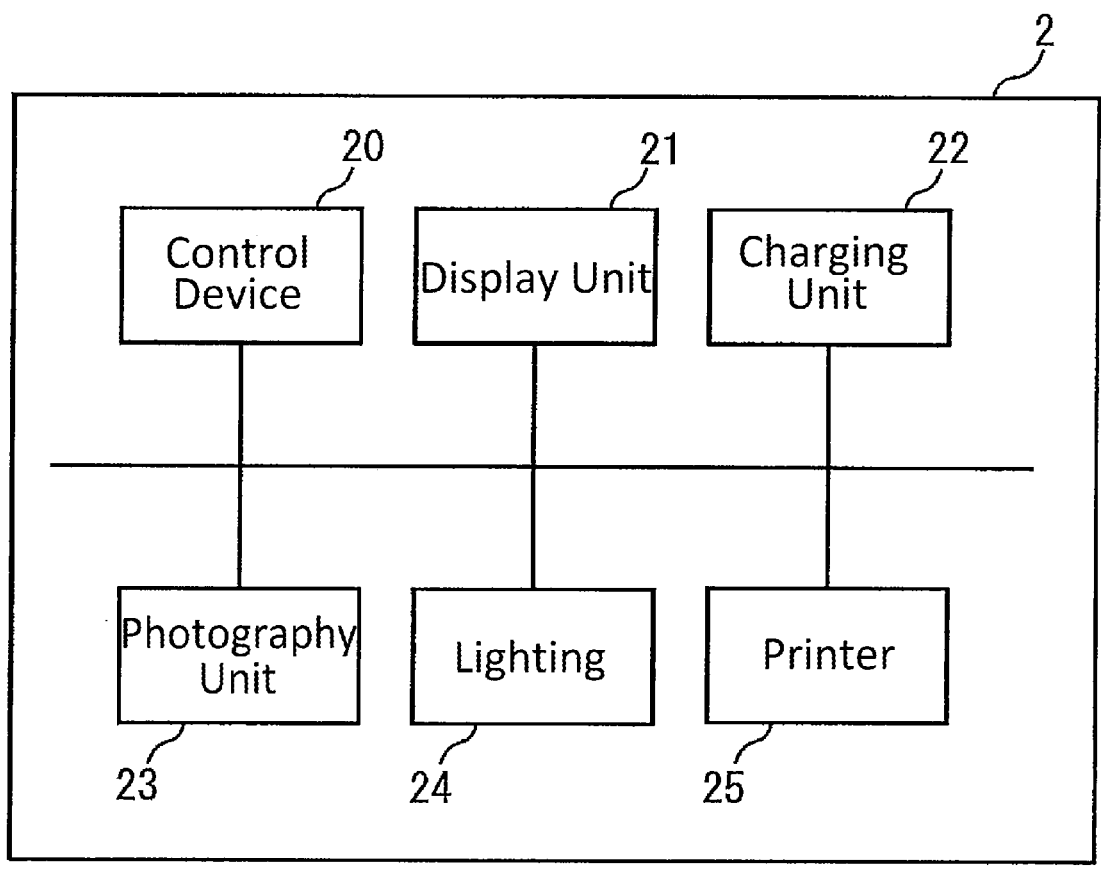

[Fig. 9]
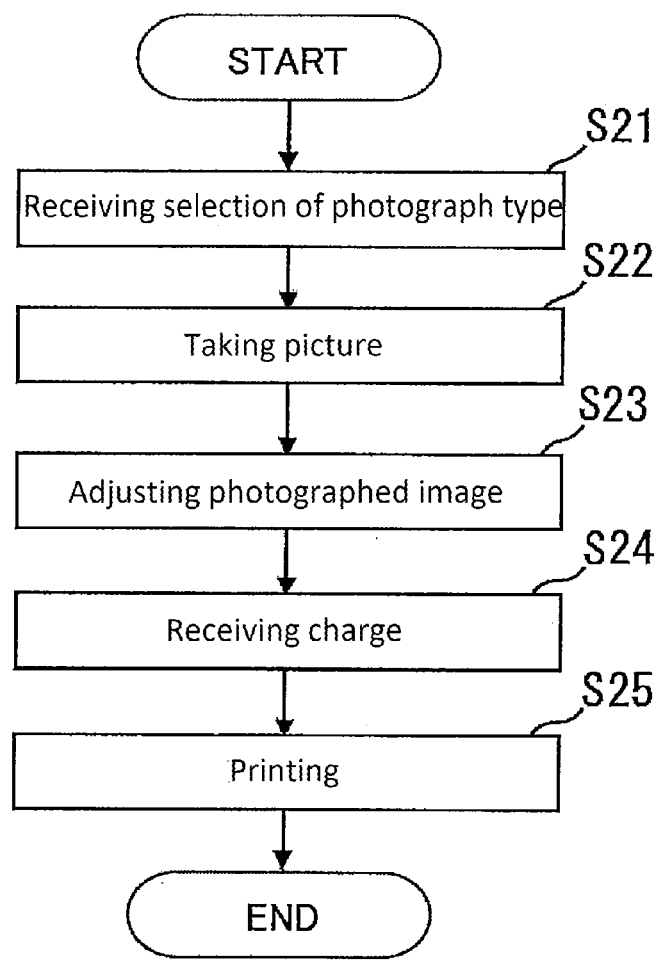

[Fig. 10]
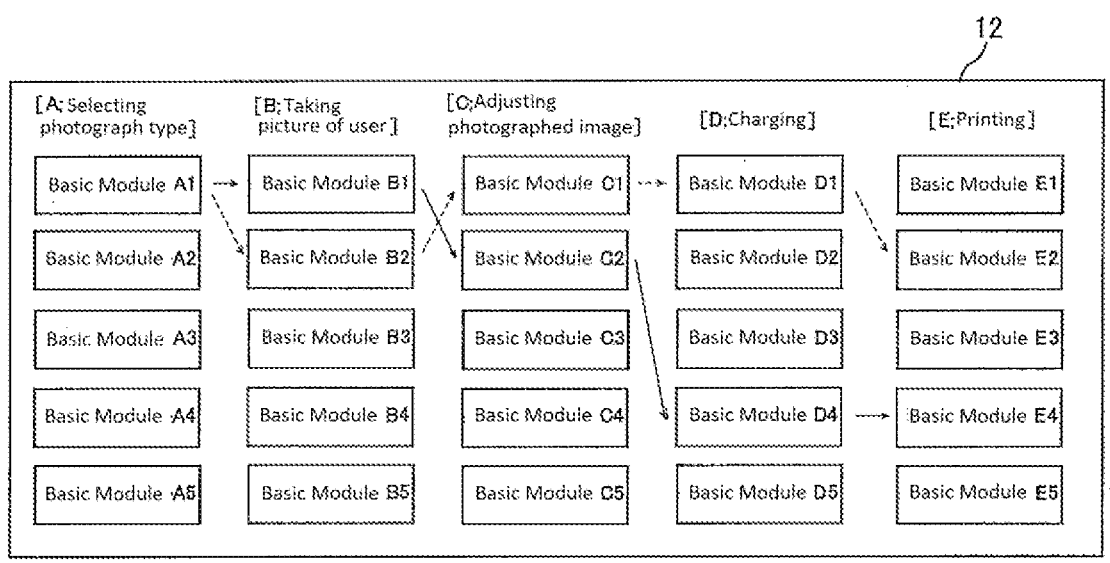

SOFTWARE CREATION BASED ON SETTABLE PROGRAMMING LANGUAGE

TECHNICAL FIELD

The present invention relates to a software creating device for creating software, a software creating method, and a program for the same.

BACKGROUND

A certification photograph machine for producing a print such as a certification photograph performs a series of processing: selecting a type of a photograph, e.g., for a résumé or for a passport, taking a photograph of a user, adjusting the photographed image, charging, and printing (see Patent Document 1, for example).

At this time, a control device inside the certification photograph machine executes software pertaining to the series of such processing, and performs device control of the certification photograph machine. A human programmer often creates such the software in advance.

RELATED ART

[Patent Document 1] Japanese Unexamined Patent Application Publication No. 2019-008169 (JP-A-2019-008169)

SUMMARY

However, conventional human creation of such the software is time-consuming. In addition, different persons write different programs, which sometimes results in different qualities of the finished software.

The present invention is made in view of above issues, and it is an object of the present invention to provide a software creating device and the like with which labor saving can be made when creating software.

In response to the above issues, a first aspect of the present invention is a software creating device including storage part and software creating part. The storage part stores a plurality of basic modules for executing each of a plurality of processes. The software creating part creates software for consecutively performing the plurality of processes, by performing reinforcement learning using the basic modules and combining the basic modules.

The software creating device according to the present invention employs reinforcement learning, which is a technique of artificial intelligence (AI), and can create software for executing a series of processes by combining existing basic modules. This can save labor in creating software and also can create software with constant quality.

The reinforcement learning employed in the creation of the software is preferably deep reinforcement learning. Employing deep reinforcement learning that uses a deep learning technique for presenting an action-value function and the like in the reinforcement learning makes it possible to efficiently create high-quality software from the multiple basic modules.

The software creating device preferably further includes input-receiving part configured to receive an input of a requirement specification for the software at the time of creating the software. For example, the requirement specification includes any of inputs and outputs for the software, a device driver used for the software, and an arithmetic processing module used for the software. This makes it possible for creation of the software to comply with the requirement specification. The requirement specification includes the above inputs and outputs, the device driver, the arithmetic processing modules, and so on, and the software that complies with such specification can be created.

When it is impossible to create the software, the input-receiving part preferably receives re-entry of the requirement specification. If the originally entered requirement specification is insufficient, learning results may diverge and thus the software may not be created. The present invention receives re-entry of the requirement specification in such cases and can re-try creating the software.

It is also preferable that the software creating device further includes setting-receiving part configured to a setting for a programming language or a development environment at the time of creating the software, and that the software creating part creates the software by using the basic modules that correspond to the set programming language or the development environment. This can create the software complying with the set programming language and the development environment.

The software performs device control, for example, and operates a control program predetermined for a device in equipment. This can create software for controlling a device such as a certification photograph machine, and the software allows the device to perform predetermined functions through operating the control program for the device. In this case, the control program is an existing program predetermined for the device and the software creating device does not create the control program.

The software creating device may further include basic-module creating part configured to create the basic modules by performing the reinforcement learning using a plurality of commands and combining the commands. The reinforcement learning employed for creating the basic modules is preferably deep reinforcement learning. A programmer creates the basic modules used for the creation of the software in advance, for example. However, the reinforcement learning may create simple basic modules by combining the commands, which can further save labor in creation of the software. Employing the deep reinforcement learning also in such the case can efficiently create the basic modules with high quality.

It is preferable that rewards in the reinforcement learning include either of code size, processing time, or the number of bugs. This can create the software and the basic modules with smaller code size, less processing time, and the smaller number of bugs.

It is also preferable that the rewards in the reinforcement learning in creating the software include an evaluation value based on the number of bugs and significance of the bags at the time of debugging the combinations of the basic modules. This can create the software without any serious bugs, and also can reduce time necessary for debugging, while conventional debugging requires manpower to check bugs in the programming stage.

Also, it is preferable that, when calculating the rewards in the reinforcement learning, a memory space for operating the combination of the basic modules is allocated on a virtual memory so that the memory space is protected. This prevents other memory space for the creation of the software from breaking when the combination of the basic modules malfunctions at the time of calculating the rewards.

The storage part preferably stores a plurality of basic modules that are written in different programming languages, which can be translated into an identical machine language. This allows software creating processes to cope with various programming languages.

The software creating part preferably creates source codes of the program written in a programming language for the software. Also, the software creating part preferably creates a program written in a machine language for the software and the source codes. Creating the source codes written in a human-readable programming language as a result of the software creating processes is preferable in views of security and credibility since humans can check the software. Such the source codes are provided with the executable program written in the machine language, for example.

A second aspect of the present invention is a software creating method in which a computer including storage part, which stores a plurality of basic modules for executing each of a plurality of processes, performs reinforcement learning using the basic modules and combining the basic modules so as to create software for consecutively performing the plurality of processes.

A third aspect of the present invention is a program that causes a computer including storage part, which stores a plurality of basic modules for executing each of a plurality of processes, function as a software creating device having software creating part configured to create software for consecutively performing the plurality of processes by performing reinforcement learning using the basic modules and combining the basic modules.

Also, in the first to third aspects of the present invention, equipment controlled by the software is preferably a certification photograph machine or a box-shaped photography apparatus.

The present invention can provide a software creating device and the like that can save labor in creation of software.

BRIEF DESCRIPTION OF THE DRAWINGS

FIG. 1 is a view showing a hardware configuration of a software creating device 1.

FIG. 2 is a view showing a functional configuration of the software creating device 1.

FIG. 3 is a view showing basic modules.

FIG. 4 is a flowchart showing a software creating method.

FIG. 5 is an example illustrating an arithmetic processing module setting screen 100.

FIG. 6A is a view illustrating the software creating method.

FIG. 6B is a view illustrating the software creating method

FIG. 7 is a view showing a certification photograph machine 2.

FIG. 8 is a view showing a hardware configuration of the certification photograph machine 2.

FIG. 9 is a flowchart showing processes of the certification photograph machine 2.

FIG. 10 is a view showing the basic modules.

DETAILED DESCRIPTION

Hereinafter, preferable embodiments of the present invention will be described with reference to the accompanying drawings.

(1. Software Creating Device 1) FIG. 1 is a view showing a hardware configuration of a software creating device 1 according to an embodiment of the present invention. The software creating device 1 is for creating software and can be achieved by a computer including a control unit 11, a storage unit 12, an input unit 13, a display unit 14, and a communication control unit 15 that are connected with each other by means of a bus 16. However, the configuration of the software creating device 1 is not limited and any other various configurations may be used.

The control unit 11 includes a CPU, a ROM, a RAM, and so on. The CPU reads out programs related to processing of the software creating device 1 and stored in storage media such as the storage unit 12 and the ROM to a working space on the RAM, and executes the programs. The ROM is a non-volatile memory used to permanently store programs such as a boot program and the BIOS, data and the like. The RAM is a volatile memory used to temporarily store programs and data loaded from the storage unit 12 or the ROM. The RAM also includes the working space to be used by the control unit 11 for executing various processing.

The storage unit 12 is either a hard disk drive, a solid state drive, a flash memory, or the like, that stores programs to be executed by the control unit 11, data necessary for the execution of the programs, an OS, and so on. The control unit 11 reads out and executes such the programs and data as necessary.

The input unit 13 is for entering various settings into the software creating device 1. The display unit 14 is a liquid crystal display, for example. The communication control unit 15 is a communication interface for communication via a network and the like. The bus 16 is a path for transferring control signals and data signals between the units of the software creating device 1.

FIG. 2 is a view showing a functional configuration of the software creating device 1. As shown in FIG. 2, the software creating device 1 includes storage part 101, input-receiving part 102, setting-receiving part 103, software creating part 104, basic-module creating part 105, and so on.

The storage part 101 corresponds to the storage unit 12 and stores as its own library a plurality of basic modules that are base elements for creation of software. The basic modules will be described below.

The input-receiving part 102 is for the control unit 11 of the software creating device 1 to receive, at the time of creating software, a requirement specification for the software from a user. The software creating device 1 creates the software using the input requirement specification. Also, if the input requirement specification is insufficient to create the software, the software creating device 1 receives re-entry of the requirement specification. The requirement specification will be described below.

The setting-receiving part 103 is for the control unit 11 of the software creating device 1 to receive, at the time of creating software, settings on a programming language or a development environment from the user. The software creating device 1 creates the software using the set programming language and the basic modules corresponding to the set development environment.

The software creating part 104 is for the control unit 11 of the software creating device 1 to create the software by performing reinforcement learning using the basic modules. The present embodiment particularly employs deep reinforcement learning that uses a deep learning technique for presenting an action-value function and the like in the reinforcement learning.

The basic-module creating part 105 is for the control unit 11 of the software creating device 1 to create itself the basic modules by performing the reinforcement learning using a plurality of commands. In the present embodiment, the above deep reinforcement learning can also be used to create the basic modules.

(2. Basic Modules) The software creating device 1 of the present embodiment is for creating software that controls equipment. The storage unit 12 of the software creating device 1 stores, as shown in FIG. 3, a library of the plurality of basic modules in advance. The plurality of the basic modules execute each of a plurality of processes A to E for the equipment. The plurality of the processes A to E are to be executed consecutively in the equipment. An example of the equipment is a certification photograph machine, which will be described below.

Such the basic modules are pre-existing modules created by a programmer in advance for executing individual processes, and are linked to the programming language and the development environment used at the time of creation and stored in the storage unit 12. For example, although the basic modules A1, A2, A3, A4, and A5 are the plurality of basic modules for executing the same process [Process A], contents of the basic modules differ depending on persons created the modules and on the programming language or the development environment used.

A method for entering the basic modules into the software creating device 1 is not limited: each of the basic modules may be input individually; or software created by a programmer for executing a series of the processes A to E may be input into the software creating device 1, which then extracts from the input software the basic modules for executing each of the processes.

(3. Software Creating Method) Next, a software creating method to be performed by the software creating device 1 will be described with reference to FIG. 4 and so on. FIG. 4 is a flowchart showing the software creating method. The control unit 11 of the software creating device 1 executes each of steps in FIG. 4.

In the present embodiment, firstly, the software creating device 1 displays an input screen (not shown in the drawing) on the display unit 14. The user then enters the requirement specification on the input screen. The software creating device 1 receives the entry of the requirement specification (S1).

The requirement specification corresponds to the software to be created. The requirement specification includes, for example, at least any one of settings including inputs and outputs of the software, a device driver used in the software, and an arithmetic processing module used in the software. The software creating device 1 does not program the above itself.

In the present embodiment, the inputs and outputs are information relating to definitions of inputs and outputs in the series of processes executed by the software.

The device driver is driver software for a device in the equipment. The driver software entered as the requirement specification in S1 executes a device control program. The software creating device 1 of the present embodiment does not create this device control program, and the software operates the control program predetermined for the device in the equipment.

The arithmetic processing module is a program module for arithmetic processing used by the software. The arithmetic processing module includes a calculation program of the four basic operations in arithmetic, where, for example, the inputs are vertical and horizontal lengths in inches and the output is an area in millimeters. Another example of the arithmetic processing module is an image-processing program, where, for example, the inputs are images of two faces and the output is a result of a decision on whether the two faces are identical or not. The arithmetic processing module is provided as a library such as a dynamic link library (DLL), as a software development kit (SDK), or simply as a module.

The software employs the designated arithmetic processing module as is without modification.

Setting files for defining the arithmetic processing modules and inputs and outputs thereof may be registered in advance, and the arithmetic processing module may be designated by specifying the file. Alternatively, an arithmetic processing module setting screen 100 as shown in FIG. 5, for example, may be displayed on the display unit 14, and the arithmetic processing module and the inputs and outputs thereof can be designated using a module setting column 110, an input item setting column 120, and an output item setting column 130, respectively. In the example of FIG. 5, a registration button 140 is pressed after setting the above.

Next, the software creating device 1 displays a setting screen (not shown in the drawing) on the display unit 14, and the user sets the programming language and the development environment on the setting screen. The software creating device 1 receives the settings for the programming language and the development environment (S2).

The programming language is a programming language that is to be used in the basic modules employed to create the software. The development environment is a development environment that is used at the time of creating the basic modules. The development environment is software for processes such as source code input, debugging, and compiling, and sometimes called as an integrated development environment (IDE). An example of the development environment is Visual Studio.

After the above inputs and settings, the software creating device 1 then performs reinforcement learning employing the basic modules stored in the storage unit 12 to create the software for consecutively executing the plurality of processes by combining the basic modules (S3).

In the step S3, the software creating device 1 extracts, among the basic modules stored in the storage unit 12 for example, the basic modules that correspond to the programming language and the development environment set in the step S2. The software creating device 1 then uses the extracted basic modules to perform the reinforcement learning, particularly the deep reinforcement learning. The deep reinforcement learning uses a deep learning technique for presenting the action-value function and the like.

In the present embodiment, by employing known techniques of the reinforcement learning and the deep reinforcement learning, of which detail descriptions will be omitted, the software creating device 1 decides which of the basic modules to be executed for the individual processes A to E, selects orders of the processes A to E, and creates a combination of the basic modules for such the consecutive processes, for example.

FIG. 6A is an example of a creation of a combination in which the basic modules A5, B1, C1, D2, and E4 are performed in this order. FIG. 6B is an example of a creation of a combination changed from FIG. 6A, in which the [process D] is performed immediately after the [process A], with the basic modules A5, D2, B1, C1, and E4 being performed in this order. An arithmetic process module (an arithmetic process module A in the drawing), which is entered as the requirement specification in the step S1, operates, but not limited to, after the [process C], and a device driver (a device driver A in the drawing) operates, but not limited to, after the [process E] at the end of the consecutive processes in the examples in FIG. 6.

The software creating device 1 operates the combination of the basic modules created as above, and finds rewards for the reinforcement learning (the deep reinforcement learning) from results of the operation. The rewards include at least, but not limited to, any one of code size, processing time, and the number of bugs of the created combination of the basic modules. For example, the rewards may include smooth completion of the consecutive processes, or the like. Also, the code size may be, but not limited to, the number of lines of the program, for example.

At the time of finding the rewards, a memory space for operating the combination of the basic modules is to be allocated on a virtual memory managed by the software creating device 1. It is preferable that this protects the memory space and can prevent other memory space concerning the creation of the software from breaking when the combination of the basic modules malfunctions.

The reinforcement learning (the deep reinforcement learning) repeats the above attempts multiple times to create and update a rule for selecting the basic modules that can maximize the rewards, combines the basic modules following the rule so as to maximize the rewards, and outputs the combination as the software. The software is created as above in the step S3.

The requirement specifications entered in the step S1 are used for setting various functions to be used in the reinforcement learning (the deep reinforcement learning) and for creating and executing the combination of the basic modules. However, there may be a case where the entered requirement specifications are insufficient that the results of the learning diverge and the software cannot be created. In such the case, the software creating device 1 may display a screen for re-entering the requirement specifications to prompt the user to correct, expand, or improve the requirement specifications, and receive the re-entry of the requirement specifications. In this way, when the originally entered requirement specifications are insufficient, the software creating device 1 can receive the re-entry of the requirement specifications and try to create the software again.

Also, for simple processes, the software creating device 1 may itself create the basic modules, which can further save labor in the creation of the software. In such the case, similarly as the above, the basic modules may be created by employing the reinforcement learning. For example, by using a plurality of predetermined commands through the similar procedure, a combination of the commands that can maximize the rewards can be output as the basic modules. As the reinforcement learning, the deep reinforcement learning may be used similarly as above, and the rewards may include, similarly as above, at least one of the code size, the processing time, and the number of bugs. The software creating device 1 stores such the created basic modules along with the basic modules created by programmers in the storage unit 12 as a library so as to create the software by using these basic modules in the step S3. The above also applies to the arithmetic processing module: the software creating device 1 itself is capable of creating the arithmetic processing module and of using the arithmetic module in the software.

(4. Certification Photograph Machine 2) FIG. 7 is a view showing a certification photograph machine 2, which is an example of the equipment that is controlled by the software created by the software creating device 1. FIG. 8 is a view showing a configuration of hardware of the certification photograph machine 2.

The certification photograph machine 2 is a box-shaped photography apparatus installed on the street, for example. The certification photograph machine 2 takes images of a user and prints out the images as certification photographs etc. The certification photograph machine 2 includes a control device 20, a display unit 21, a charging unit 22, a photography unit 23, a lighting 24, a printer 25, and so on.

The control device 20 is provided inside the certification photograph machine 2 and executes the software created by the software creating device 1 to execute processes described below for the certification photograph machine 2. A computer including a control unit, a storage unit, an input unit, a communication unit, and so on is used as the control device 20, for example.

The display unit 21 is achieved by a display having a touch panel or the like, which also works as an input unit for the certification photograph machine 2. The display unit 21 displays various screens for user operations and selections, and receive directions and inputs from the user who operates the touch panel on the screens.

The charging unit 22 includes an input slot for coins and bills, a return slot for change, a receipt outlet, a receipt printer, and so on (not shown in the drawing), for managing charges from the user and issuing the receipts.

The photography unit 23 includes a camera or the like that is provided inside a photography window. The camera is, but not limited to, a high-resolution digital camera, for example.

The lighting 24 illuminates an entire interior of the box of the certification photograph machine 2. The lighting 24 is, but not limited to, a plane light source illuminating white light, and is provided above the photography unit 23, for example. A stroboscopic light is also provided inside the box of the certification photograph machine 2 as a flashlight for taking photographs.

The printer 25 is provided inside the certification photograph machine 2 and prints the images onto paper. The printed paper on which the images are printed is discharged to a print dispensing slot (not shown in the drawing). The system or the number of printers 25 is not particularly specified.

FIG. 9 is a flowchart showing an outline of processes of the certification photograph machine 2. The control unit 20 controls each unit of the certification photograph machine 2 to execute each of the steps in FIG. 9.

The processes of the certification photograph machine 2 will be described briefly below with reference to FIG. 9. The certification photograph machine 2 displays a selection screen (not shown in the drawing) on the display unit 21 to show selectable photograph types. Then, after receiving a selection of the photograph type from the user (a step S21), the certification photograph machine 2 starts taking a picture of the user (a step S22). The photograph types are types of photographs for various usages, such as for a résumé or for a passport.

The certification photograph machine 2 makes adjustment (image processing) to the user's photographed image according to the photograph type selected in the step S1 (a step S23), and displays a charging screen on the display unit 21 to prompt the user to pay for the charge. After the charging unit 22 receives the charge from the user (S24), the certification photograph machine 2 prints out the adjusted image according to the photograph type (S25).

When creating the software for device controlling of the certification photograph machine 2, the storage unit 12 stores, as shown in FIG. 10, the plurality of basic modules for executing each of the plurality of processes such as [A; selection of the photograph type], [B; taking a picture of the user], [C; adjusting the photographed image], [D; charging], and [E; printing].

Each of the basic modules A1, A2, A3, A4, and A5 is a partial program for executing the process [A; selection of the photograph type], which, for example, displays the screen for selecting the photograph type on the display unit 21 of the certification photograph machine 2 and receives the selection of the photograph type in response to the touch operation of the user on the selection screen.

Each of the basic modules B1, B2, B3, B4, and B5 is a partial program for executing the process [B; taking a picture of the user], which, for example, displays a guidance screen for photography on the display unit 21 of the certification photograph machine 2 and controls the photography unit 23 and the lighting 24 to take a picture of the user.

Each of the basic modules C1, C2, C3, C4, and C5 is a partial program for executing the process [C; adjusting the photographed image], which, for example, performs the image processing on the user's photographed image according to the selected photograph type. That is, image sizes etc. of the certification photograph differ depending on the photograph types such as for a résumé or for a passport, and thus the basic modules C1, C2, C3, C4, and C5 perform the image processing such as changing the image size according to the different photograph types.

Each of the basic modules D1, D2, D3, D4, and D5 is a partial program for executing the process [D; charging], which, for example, displays the charging screen on the display unit 21 of the certification photograph machine 2 to prompt the charging, and examines if the charging is done properly by controlling the charging unit 22.

Each of the basic modules E1, E2, E3, E4, and E5 is a partial program for executing the process [E; printing], which, for example, controls the printer 25 of the certification photograph machine 2 for printing the image onto paper and cutting the paper according to the selected photograph type, and discharging the printed image.

The software for device controlling of the certification photograph machine 2 can be created using such the basic modules as described in FIG. 4 and so on. Here, the software creating device 1 selects, as illustrated by solid-line arrows in FIG. 10, the basic modules for the processes A to E in FIG. 10, and then finds the rewards (evaluation) of the combination of the selected basic modules as mentioned above. The rewards are simple, such as the code size and the number of bugs as mentioned above, and the less total code size and the less number of bugs give the higher rewards. The software creating device 1 repeats the selection of the basic modules and calculation of the rewards thereof by changing the selection of the basic modules for the each of the processes A to E (an example is shown by dotted-line arrows in FIG. 10), for example, so as to find, by trial and error, a rule for selecting the basic modules that can maximize the rewards (for example, "selecting the basic module B2 following the basic module A1" and so on; the rule is also called as a policy in the reinforcement learning). By performing the selection following this selection rule, the software that executes the processes A to E consecutively can be created. The above method, including the specific method for creating the selection rule, is known as the reinforcement learning.

In such the case, examples of the inputs entered as the requirement specifications in the step S1 are definitions of conditions such as "receiving the selection of the photograph type" or "adjusting the photographed image of the user". Examples of the outputs entered as the requirement specifications in the step S1 are definitions on operations of the certification photograph machine 2, such as "transferring the image to the printer and printing out the image" or "collecting the charge". In addition, the inputs and outputs may be programs to be executed prior to and/or after the operation of the software.

Also, the device driver entered as the requirement specification in the step S1 becomes a driver software that is to be used in the display unit 21, the photography unit 23, the printer 25, and so on, for example. Such the device driver is used not only at the end of the processes of the software but in the middle of the processes.

As described above, the software creating device 1 according to the present embodiment employs the reinforcement learning, which is an AI technology, to create the software for executing the consecutive processes by combining the existing basic modules. This enables to save labor in creation of the software and also to create the software with constant quality. The present embodiment particularly employs the deep reinforcement learning so that the high-quality software can be efficiently created with multiple basic modules.

Also, the present embodiment receives inputs of the requirement specifications in the step S1 so as to create the software complying with the requirement specifications. As mentioned above, the requirement specifications include the inputs and outputs for the software, the device driver to be used in the software, the arithmetic processing modules, and so on. The present embodiment can create the software in compliance with such the settings. Also, if the originally entered requirement specifications are insufficient that the results of the learning diverge and the software cannot be created, the software creating device 1 can receive re-entry of the requirement specifications and try to create the software again.

The present embodiment further receives the settings for the programming language and the development environment in the step S2 so that the software creation complying with the settings for the programming language and the development environment is possible.

Also, the software created in the present embodiment is for device controlling the certification photograph machine 2 or the like, which achieves the predetermined functions of the equipment by operating the control programs of the device in the equipment. In such the case, the control programs are existing programs predetermined for the device, and the software creating device 1 does not create such the control programs. It is also possible to create the software that does not perform the device control (the software that performs only the arithmetic, for example) by using the method of the present embodiment. In such the case, the operations of the device control programs are unnecessary, which further simplifies the creating process of the software.

Also, in the present embodiment, the basic modules for simple processes can be created by using the reinforcement learning, which can further save labor in the creation of the software. Also in this case, employing the deep reinforcement learning makes it possible to efficiently create the high-quality basic modules.

When creating the software and the basic modules, smallness of the code size, the process time, and the number of bugs is considered as the rewards in the reinforcement learning so that the software and the basic modules with less the code size, the process time, and the number of bugs can be created.

Also, in calculating the rewards, the memory space for operating the combination of the basic modules is allocated on the virtual memory to be protected, and this prevents other memory space for the creation of the software from breaking when the combination of the basic modules malfunctions.

Nevertheless, the present invention is not limited to the embodiments described above. For example, the rewards in the reinforcement learning are not limited to the above: when creating the software, debugging may be done under various conditions using a predetermined evaluation program for the combination of the basic modules, and an evaluation value based on the number of bugs and importance (seriousness) of the individual bugs detected at the time may be taken as the rewards. The evaluation value may be obtained by, but not limited to, adding the importance of each of the detected bugs, for example. The importance of a bug can be determined based on seriousness of influences of the bug (for example, whether the bug makes the execution of the process impossible, or the process ends up in a wrong result because of the bug, etc.) or frequency of the bug. This can create the software without serious bugs. Also, this reduces time necessary for debugging, while conventional debugging requires manpower to check bugs in the programming stage.

Also, when operating the combination of the basic modules, the software creating device 1 translates the basic modules written in the programming language set in the step S2 into a machine language to be executed. Thus, the program of the software created in the step S3 may be written in the machine language. In such the case, the machine language can be translated back into the programming language set in the step S2 so as to create human-readable source code. This allows humans to check the software, which is preferable in the views of security and credibility. It is also possible to create the software program in the executable machine language and the above source codes in the step S3.

Also, the software creating device 1 translates the basic module written in a programming language into a machine language, and then translates the program back into various programming languages. This can create the plurality of basic modules written in different programming languages that can be translated into an identical machine language. The storage unit 12 stores such the programs as a library so that the software creating process can adapt to various programming languages.

Although the preferred embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

The invention claimed is:

1. A software creating device comprising:
data storage configured to store a plurality of basic modules written in different programming languages, for executing each of a plurality of processes; and
a processor connected to the data storage and configured to:
create the basic modules written in the different programming languages by:
translating one of the basic modules written in a first programming language into a machine language and translating the translated one basic module into a second programming language;
receive setting for a programming language when creating software;
create software for consecutively performing the plurality of processes by performing reinforcement learning using the basic modules that correspond to the set programming language and combining the corresponding basic modules;
wherein the rewards in the reinforcement learning in creating the software include an evaluation value based on the number of the bugs and significance of the bugs at the time of debugging the combinations of the basic modules.

2. The software creating device according to claim 1, wherein
the reinforcement learning employed in the creation of the software is deep reinforcement learning.

3. The software creating device according to claim 1, wherein the processor is configured to:
receive an input of a requirement specification for the software when creating the software.

4. The software creating device according to claim 3, wherein
the requirement specification includes any of inputs and outputs for the software, a device driver used for the software, and an arithmetic processing module used for the software.

5. The software creating device according to claim 3, wherein
the processor receives re-entry of the requirement specification when it is impossible to create the software.

6. The software creating device according to claim 1, wherein the processor is configured to:
receive a setting for a development environment when creating the software: and
create the software by using the basic modules that correspond to the development environment.

7. The software creating device according to claim 1, wherein
the software is configured to control equipment by operating a control program predetermined for a device in the equipment.

8. The software creating device according to claim 1, wherein the processor is configured to:
create the basic modules by performing the reinforcement learning using a plurality of commands and combining the commands.

9. The software creating device according to claim 8, wherein
the reinforcement learning employed in creating the basic modules is deep reinforcement learning.

10. The software creating device according to claim 1, wherein
rewards in the reinforcement learning include any of code size, processing time, or a number of bugs.

11. The software creating device according to claim 1, wherein
when calculating rewards in the reinforcement learning, a memory space for operating the combination of the basic modules is allocated on a virtual memory so that the memory space is protected.

12. The software creating device according to claim 1, wherein the processor is configured to:
create source codes of a program of the software written in a programming language.

13. The software creating device according to claim 12, wherein the processor is configured to:
create a program written in a machine language for the software, and the source codes.

14. A software creating method, comprising: storing a plurality of basic modules written in different programming languages, for executing each of a plurality of processes; and using a processor;
creating the basic modules written in the different programming languages by: translating one of the basic modules written in a first programming language info a machine language; and
translating the translated one basic module into a second programming language, receiving a setting for a programming language when creating software: and creatine software for consecutively performing the plurality of processes by performing reinforcement learning using the basic modules that correspond to the set programming language and combining the corresponding basic modules;
wherein the rewards in the reinforcement learning in creating the software include an evaluation value based on the number of the bugs and significance of the bugs at the time of debugging the combinations of the basic modules.

15. A computer-readable storage medium containing instructions causing processor to:
create a plurality of basic modules written in different programming languages that are stored in a data storage, by:
translating one of the basic modules written in a first programming language into a machine language; and
receive a setting for a programming language when creating software; and
create software for consecutively performing the plurality of processes by performing reinforcement learning using the basic modules that correspond to the set programming language and combining the corresponding basic modules;
wherein the rewards in the reinforcement learning in creating the software include an evaluation value based on the number of the bugs and significance of the bugs at the time of debugging the combinations of the basic modules.

16. The software creating device according to claim 1, wherein
equipment to be controlled by the software is a certification photograph machine or a box-shaped photography apparatus.

17. The software creating method according to claim 14, wherein
equipment to be controlled by the software is a certification photograph machine or a box-shaped photography apparatus.

18. The computer-readable storage medium according to claim 15, wherein
equipment to be controlled by the software is a certification photograph machine or a box-shaped photography apparatus.

* * * * *